Oct. 14, 1941.   W. R. DRESSER   2,258,677
ELECTRICAL APPARATUS
Filed Feb. 2, 1937    5 Sheets-Sheet 1
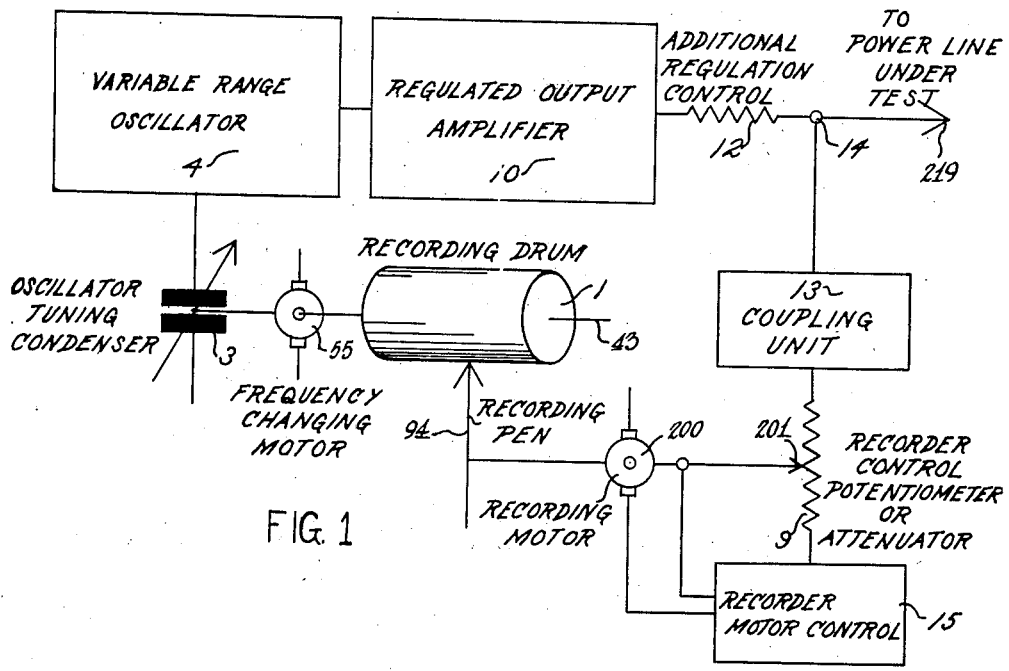
FIG. 1
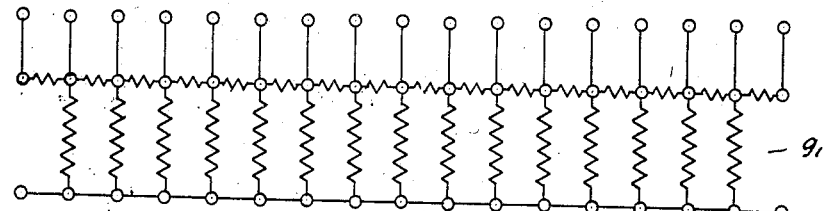
FIG. 1a.  CONTINUOUS SECTION ATTENUATOR
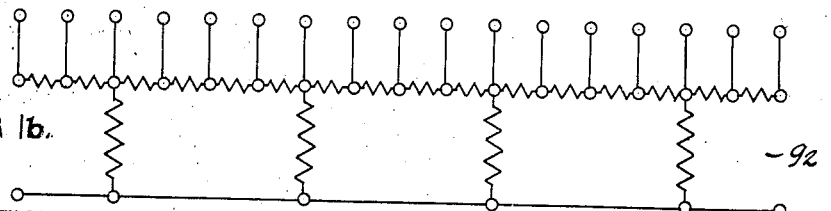
FIG. 1b.
TAPPED SECTION ATTENUATOR APPROXIMATING CONTINUOUS SECTION UNIT.
FIG. 12.
INVENTOR
W. Robert Dresser
BY
Ezekiel Wolf
his ATTORNEY Oct. 14, 1941.　　　W. R. DRESSER　　　2,258,677
ELECTRICAL APPARATUS
Filed Feb. 2, 1937　　　5 Sheets-Sheet 4

INVENTOR
W. Robert Dresser
BY
ATTORNEY

Oct. 14, 1941.  W. R. DRESSER  2,258,677
ELECTRICAL APPARATUS
Filed Feb. 2, 1937  5 Sheets-Sheet 5
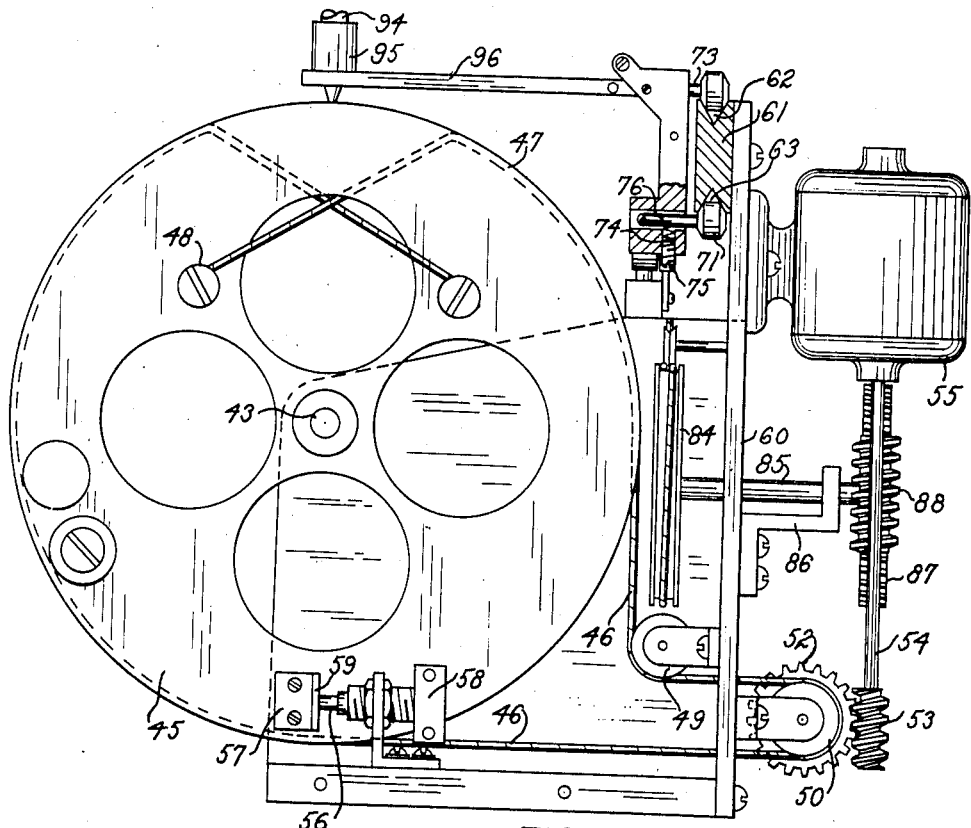
FIG. 5
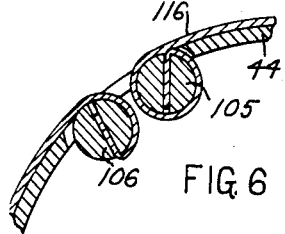
FIG. 6
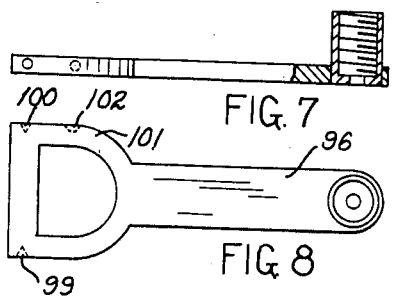
FIG. 7
FIG. 8
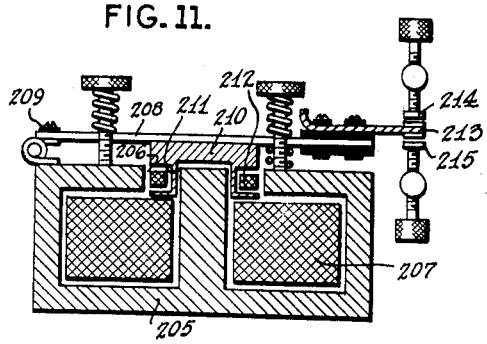
FIG. 11.
INVENTOR
W. Robert Dresser
BY
his Ezekiel Wolf
ATTORNEY Patented Oct. 14, 1941

2,258,677

UNITED STATES PATENT OFFICE 2,258,677

ELECTRICAL APPARATUS

Willis Robert Dresser, Stratford, Conn., assignor to Tobe Deutschmann Corporation, Canton, Mass.

Application February 2, 1937, Serial No. 123,623

3 Claims. (Cl. 175—183)

The present invention relates to a method and apparatus for producing a graphical record of electrical measurements of electrical networks. In particular, the method and apparatus is primarily designed to record power line characteristics and more particularly for the determination of physical or electrical faults that may appear on such lines because of grounds, open circuits, short circuits, and other effects foreign to the characteristics of the line as designed. More particularly the method and apparatus is designed to locate the position of faults upon the line so that a repair crew may be despatched to the exact point of trouble without delay. In this respect the characteristics of the line need not be accurately determined so long as the variations are sufficient to provide an accurate consideration of the line as it would operate under normal conditions. While the apparatus and method may also be applied to the telephone lines and to other electrical networks for the same general purpose including studying of the line characteristics and to this extent may find useful application, the principal advantage is gained in the ease to which the apparatus is applied to the line and the rapidity with which the tests are made and the faults located.

The present invention is particularly useful in high power lines that may supply whole communities or large plants and necessarily must be in continuous operation. In power lines of this nature it is highly useful to be able to determine faults very quickly, since if such lines do break down they must be put back in operation with all possible haste as is readily understood. A power or telephone line may be considered composed chiefly of series inductance and shunt capacities. Such lines unless terminated in an impedance equal to the surge impedance can have their physical length measured by the determination of the reflection characteristics and the surge impedance. For any given frequency imposed upon the sending end of the line except under conditions where the line is terminated in its surge impedance, a standing wave between the sending end and point of fault will be produced on the line in which direct and the reflected impulses will have certain phase relations depending upon the characteristics of the line and the frequency impressed and terminal conditions. Viewed from the sending end of the line for varying frequencies the line impedance will vary, depending upon whether the reflected wave is in phase or out of phase with the impressed frequency. Two general conditions may for illustration be discussed; one in which the reflected wave is 180° out of phase with the impressed wave, and the other where the impressed wave is in phase with the reflected waves depending upon terminal conditions. In the case where the reflected wave is 180° out of phase with the impressed wave, the load drawn by the line may be a minimum, and in the other case the load drawn by the line may be a maximum. As the frequency is varied from a very low value to a very high value, the load condition of maximum and minimum repeats itself periodically at the sending end of the line, the space between peaks as measured by frequency being dependent upon the length of line and the line characteristics which are known, so that the length may be determined. The distances apart on a graph of these peaks as abscissae show the spacing of the standing wave patterns on the line and give a direct measurement of the line characteristics, or if known as stated, of the position of the fault on the line. This will be more clearly understood in the discussion in the specification.

Various methods of using these principles have been devised. The method however employed by the applicant in the present application has great advantage because the determination of measurements may be made not from a laboratory and with any elaborate equipment, but merely by the use of a single apparatus applied for this purpose at most any place.

In the present application there is provided a variable frequency oscillator in which the frequency varies continuously from zero value up to and beyond 100,000 cycles per second. The frequency so generated is impressed upon the line through a power source in which the impressed voltage is allowed to vary with the line impedance, the current load remaining substantially constant or varying comparatively slightly in comparison to the voltage variation so that this becomes unimportant in determining the peaks in the characteristics curves of the line. The curve for determining the position of the line faults is associated with a vacuum tube volt meter whose function is to measure the voltage impressed upon the line and make a graphical record. This is done in the present invention in connection with an attenuator which is variably connected with the vacuum tube volt meter in such a way as to impress continually and constantly the same potential upon the vacuum tube volt meter. The varying connection between the attenuator and the vacuum tube volt meter is controlled by a recording motor which runs a recording pen or stylus and records the compensation necessary to maintain a constant or balanced input to the vacuum tube volt meter.

The invention and the method of operation and effecting measurements will be more clearly understood from the description given below in connection with the drawings illustrating an embodiment of the apparatus and the method of completing the measurements required for its use in connection with a power line.

In the drawings, Figure 1 shows a schematic outline of the units of the system in which legends are applied to indicate the units of apparatus forming the system.

Figures 1a and 1b show forms of attenuators which may be used in the system of Figure 1.

Figure 5 shows a perspective end view of the same device shown in Figure 4 with the end plate removed and viewed from the right hand side.

Figure 6 shows a detail of the manner in which the paper is held and tightened on the drum of the recorder.

Figure 7 shows a view partly in fragment of the stylus or pen holder.

Figure 8 shows a plan view of the detail shown in Figure 7.

Figure 9 shows a detail of the attenuator contact switch shown in Figure 4.

Figure 10 shows a detail of the drum of the recorder.

Figure 11 shows a sectional view of the relay control, and,

Figure 12 shows a modification of the attenuator shown in Figure 9.

Figure 2:
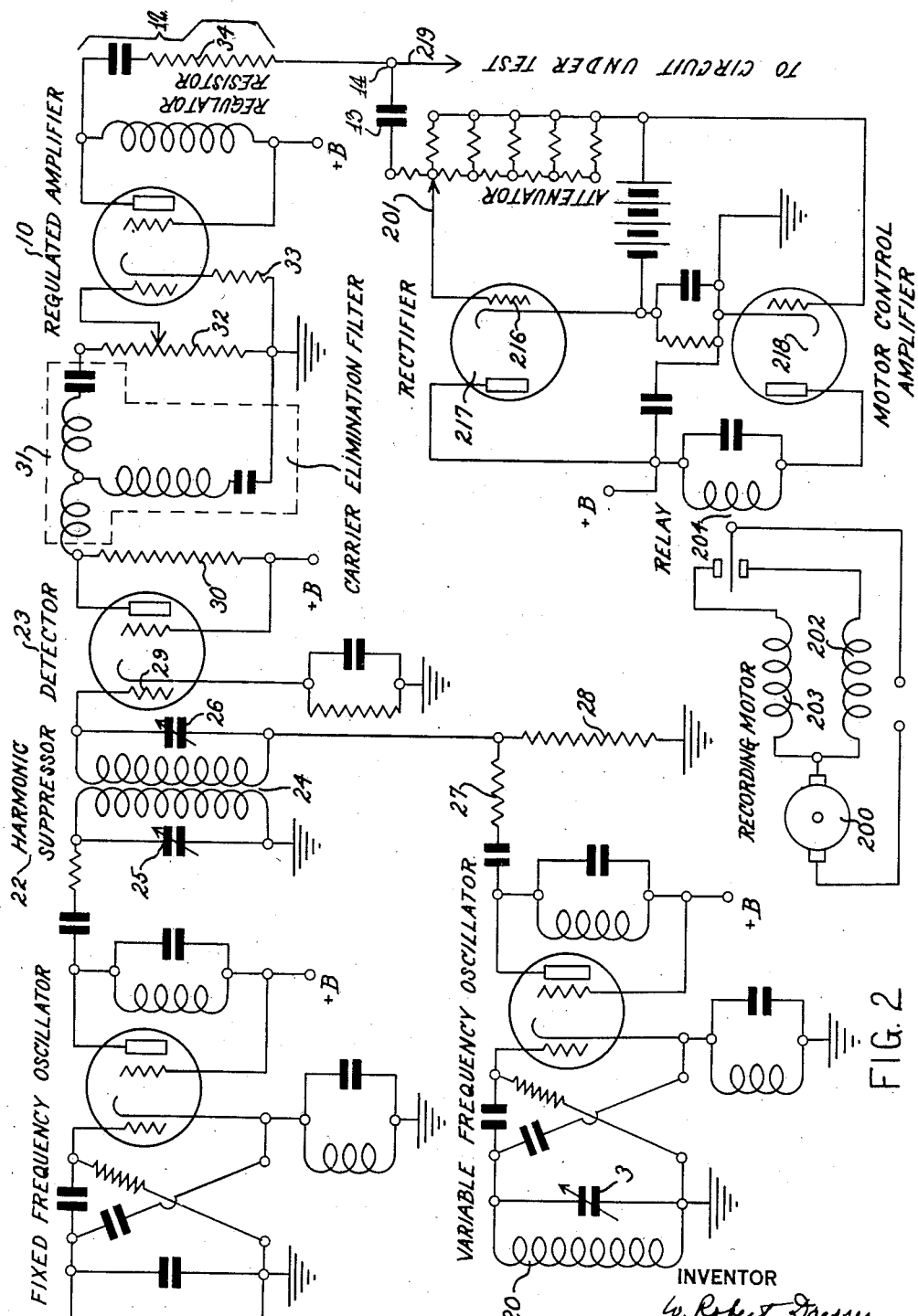
Figure 2 shows the system in its electrical circuit layout.

In the schematic outline shown in Figure 1 all of the units indicated therein may be in a single casing or in a number of casings and adapted to be easily made portable in accordance with convenience of operation.

The recording drum 1 is driven by the frequency changing motor 55 which also drives the oscillator tuning condenser 3 which is a part of the variable range oscillator 4. The recording pen 94 whose movement is normal to the axis of the drum is driven by the recording motor 200 which also controls the position of the contactor 8 on the recorder control potentiometer or attenuator 9, different forms of which are shown in Figures 1a and 1b as 9₁ and 9₂ respectively. The units just mentioned as removable in themselves are the only units which have any mechanical motion in their parts in the system. The variable range oscillator acting as the master frequency control impresses its power upon the regulated output amplifier 10 which is the power source for the power impressed upon the line through the connection indicated by the arrow 219. This power may be impressed upon the line through a regulation control 12 which may be a resistor or an impedance of a suitable character.

The recording pen in the present invention records the voltage across the line by recording the potential at the point that the coupling unit 13 is coupled to the line under test which is the connecting point indicated as 14. This coupling unit may be a condenser or some other suitable impedance. The point of contact 201 moved by means of the recording motor is tied into the recording motor control 15 in such a manner that the position of the contact 201 along the attenuator 9 produces a balance in the recording motor control 15 so that the recording motor comes to rest at a balanced position. This balanced position is a definitely established voltage of the recorder motor control and therefore it will be readily understood that the potentiometer or attenuator furnishes the compensation between the point 14 and the motor to establish this balance. This amount of regulation is therefore a measure of the potential impressed upon the line or in the present case an impedance measurement which is recorded on the recording drum since the pen 5 and the contactor 201 are moved synchronously or actually on the same shaft. The system is more completely shown in its electrical diagram in Figure 2. As indicated in this figure the variable frequency is obtained through a beat frequency oscillator which is composed of a fixed frequency oscillator and a variable frequency oscillator, the variable frequency oscillator having the oscillator tuning condenser 3 mentioned in Figure 1. Both of these units, that is the variable frequency oscillator 20 and the fixed frequency oscillator 21 as well as the harmonic suppressor 22 and the detector 23 may be all included as the variable range oscillator designated by 4 in Figure 1. The fixed frequency oscillator may have its carrier frequency approximately 550 k. c. while the variable frequency oscillator may cover a range from 550 k. c. to 450 k. c. thus presenting a beat frequency from zero to 100,000 cycles per second. This range may be increased by using a variable frequency oscillator that has a greater range variation. Preferably the beat frequency oscillator consists of two electron coupled oscillators of the Colpitts or other suitable type. The oscillators may have the usual type of construction and may have their outputs preferably from a screened plate electron tube mixed in the harmonic suppressor circuit 22 as indicated in Figure 2, which offers two sharply resonant circuits for the fixed frequency oscillator to provide complete elimination of fixed frequency oscillator harmonics. This is obtained through the harmonic suppressor transformer 24 which is tuned by means of the condensers 25 and 26 connected across the primary and the secondary of the transformers respectively. The primary and secondary circuits present very sharply resonant circuits for elimination of the harmonics of the fixed frequency, while the output of the variable oscillator impedances 27 and 28 has a broad frequency characteristic to allow for the frequency variations from variable frequency oscillator, the combined output from the two oscillators operating at approximately 100% modulation equivalent is supplied to the control grid 29 of a screen grid tube operating as a square law pentode detector. The plate circuit of the detector is terminated in a resistance 30 which is equal to the surge impedance of the carrier elimination filter 31. The output of the carrier elimination filter is terminated directly in the amplifier volume control potentiometer 32. The regulated amplifier 10, the input of which is the potentiometer 32, obtains its regulation as illustrated in Figure 2, partly through an unby-passed cathode biasing resistor 33 whose function is to produce a fixed output component in series with the grid to the ground circuit. This amount of degeneration is substantially proportional to the output current, which on the other hand is inversely proportional to the load impedance which factors together tend to maintain the regulation in the amplifier output system maintaining a constant current with a correspondingly broad shift of impressed voltage upon the line under test. The degeneration ratio of this system is approximately 3 to 1 for the pentode type of tubes generally employed which permits approximately 10 decibels of high frequency equalization. The output tubes of the regulated amplifier employ high plate resistance so that the variations in the output or load resistance has a maximum possible effect on the output voltage available. For conventional triode type power tubes, the usual output and load resistances are of the same order, resulting only in low values of voltage variations with variations in loading whereas with the present use of high impedance or high internal resistance tubes as the pentode type herein employed, the load resistance is usually of the order of 1/10 of the plate resistance resulting in pronounced variations in output voltage with variations in load. Under certain conditions, this regulation or variation in voltage is aided through the employment of the additional resistance in series with output system as indicated by the resistance regulator 34 making it possible to operate into a somewhat larger range of line impedance without resulting in extreme wave form distortion in the amplifier output.

The same effect mentioned above is of course also obtained through the cathode resistor 33 as set forth above. In fact the cathode resistor may be of such proportions as to make the amount of degeneration inversely proportional to the output voltage. This is the opposite condition of that usually employed in degenerative amplifiers which employ degeneration for the reduction of regulation and to decrease the effect of varying load impedances. Therefore instead of employing a feed back voltage which is proportional to and in phase with the amplifier output voltage in the present circuit, there is employed a degenerative or feed back voltage which is proportional to the output current and which will be phased in accordance with the phasing of the line input impedances. As the amplifier input circuit appears as a very high capacitive reactance between the grids and cathode, there is no appreciable variation of input current over the operating range of this system. Therefore the driving voltage which is available at the grid cathode terminals of the amplifier consists of the variable frequency oscillator input in series with the phased voltage across the cathode to ground resistor.

High values of line impedance therefore produce a low value of output current which results in only a small amount of amplifier degeneration for in-phase operation, or possibly a small amount of regeneration for output of phase operation, either condition resulting in an efficient amplifier characteristic. Low values of line impedance on the other hand produce low amplifier outputs, also because of the characteristic tube regulation and will cause additional output variation in accordance with the current phasing. This phasing will tend to further reduce the output voltage for operation into the line with any value or power factor greater than zero. For the condition where a pronounced change in phase angle is experienced as at a current node at the sending point, the feed back phasing will assist the recorder in making a pronounced change in recording slope so essential for the exact determination of frequency spacing as will appear from the curve indicated in Figure 3.

If it is desirable to increase the high frequency output of the amplifier the effect of degeneration may be reduced by suitable capacitor networks across the cathode to ground resistor 33 thereby shunting out the feed back effects. The recorder itself is indicated more clearly in Figures 4 and 5.

Figure 4:
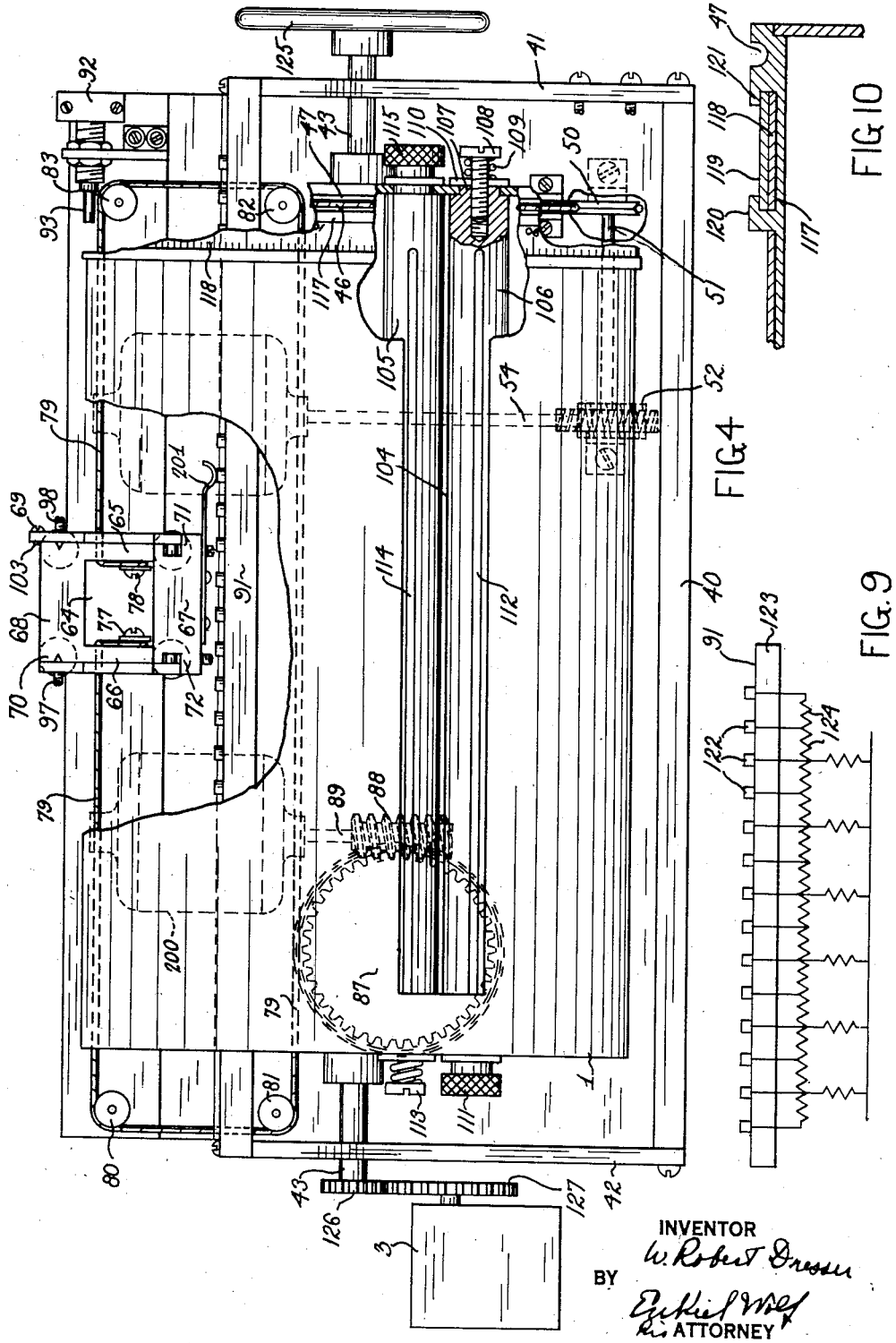
Figure 4 shows a front perspective view of the recording drum with fragments removed to show other details of the control and operating mechanism.

The recorder is mounted in a frame consisting of a base 40 with side plates 41 and 42 in which the shaft 43 carrying the drum 1 is journaled, the drum 1 shown also in Figure 1. As indicated more clearly in Figure 5 the drum may be hollow and provided with end discs 45 in which the shaft is set. Figure 4 shows the drum partly broken away to indicate not only the mechanism for driving the pen or stylus, to be explained presently, but also the mechanism for driving the drum itself. The drum 1 is driven by means of a rope drive 46 set in a groove 47 at the right end of the drum as shown by the fragment in Figure 4. This rope or belt is tensioned by a screw 48 at the end of the drum in the plate 45 so that there is a minimum amount of slip in driving the drum. The belt 48 as indicated in Figure 5 passes over an idler pulley 49 and then over the drive pulley 50 returning to the drum as indicated in Figure 5. The drive pulley 50 is mounted on a shaft 51 which is driven at the other end by the gear 52 meshing with the worm 53 at the end of the shaft 54 driven by the motor 55. The motor 55 after it is started by a suitable switch mechanism closing the motor circuit operates to drive the drum 1 through one complete revolution. At the end of the revolution the pin 56 of the stop switch 58 comes in contact with the plate 59 extending from the bracket 57 mounted on the end disc 45 and the current to the motor is broken stopping the further movement of the drum. The stylus is also driven by a motor 200 which is so connected as indicated in Figure 2, so that it may reverse and operate to drive the stylus in either direction. For the operation of the stylus there is provided a back plate 60 extending upwards from the base 40. This back plate carries at its upper end a flat bar 61 having V shaped grooves 62 and 63 respectively in the upper and lower edges of the bar.

The bar runs the entire length of the drum and acts as a guide rail for the stylus carrier. This comprises a rectangular frame 64 having two vertical members 65 and 66 and two horizontal members 67 and 68. This frame has extending therefrom two sets of rollers 69 and 70 at the top and 71 and 72 at the bottom mounted in the frame in suitable shafts as indicated by 73 in Figure 5. The lower rollers 71 and 72 are spring tensioned against the groove 63 by means of the spring 74 and an adjusting screw 75 pressing the spring against the lower shaft 76 carrying the roller 71. The same type of mounting is used for the roller 72. The rectangular frame 64 carries two clamping screws 77 and 78 at the inside of the vertical members 66 and 65 of the frame. These clamping screws hold the ends of the belt or rope 79. The belt 79 is guided in a path that substantially is an elongated rectangle as seen in Figure 4 and passes over the idler pulleys 80, 81, 82 and 83 mounted by suitable shafts on the back plate 60. The belt 79 also passes over the drive pulley 84 which is driven by a shaft 85 journaled in a bracket 86 attached to the back plate 60. The shaft 85 is driven by the spur gear 87 which in turn is driven by the worm 88 at the end of the motor shaft 89, the motor 200 being just behind the motor 55 as viewed in Figure 5. The frame 64 carries at its lower end a contact switch 201 which moves over the attenuator 91 corresponding to 9, 9₁ or 9₂ of Figure 1, 1a or 1b respectively. A limit switch is provided at the end of the frame as indicated in Figure 4, the limit switch being 92 the pin 93 of which comes in contact with the frame when it reaches that point thus stopping the driving motor. The pen or stylus 94 is mounted in a suitable collar 95 carried by the bar 96 which is pivoted between two pins 97 and 98 carried on brackets extending from the frame 64. As indicated in Figure 8 these pins engage the cones 99 and 100 made in the cross piece at the end of the bar 96 and allow the stylus and arm to rest freely on the paper of the drum. The side edge of the bar 96 in its extension 101 is cupped at 102 to engage the projection 103 so that the stylus and bar 96 may be held away from the drum when desired as when removing the paper from the drum or adjusting the apparatus. The drum itself is provided with a smooth surface and continuous except for the opening 104 where the two clamping rolls 105 and 106 are positioned. These two clamping rolls are shown in fragment section in Figure 6 and in a horizontal plan view in Figure 4. The rolls are mounted as indicated in Figure 4 in the end plates of the drum. As indicated in this figure, the roll 106 is provided with a shoulder 107 fitting in the end plate 45 of the drum. At the end of the roll there is provided a machine screw 108 which has beneath its head a spring 109 tensioning the washer 110 against the plate. The other end of the roll is provided with a knurled head 111 and may be turned by this head when the paper has been inserted in the slot 112 to tension it on the surface of the drum. The roll 108 is of a similar construction as the roll 108 except that the adjusted screw is at the left end as viewed in Figure 4 as indicated by 113. This roll is also provided with a slot 114 for tensioning the paper by turning the roll with the knurled head 115. The paper 116 is placed on the drum, inserted in the rolls 105 and 106 and tensioned until it is taut upon the drum. At the right end of the drum as shown in Figure 4 opposite the groove 47, there is provided a second groove 117 in which the printed oscillator calibration 118 may be placed and covered over with a Celluloid or other transparent protective strip 119 as indicated more clearly in Figure 10. The groove 117 may be provided at its top with inwardly extending flanges 120 and 121 to keep the scale and the cover in place. As indicated schematically in Figure 9 the attenuator 91 may comprise the contact points 122 mounted on the top of an insulating plate 123, the contacts 122 connecting with the resistance elements 124 mounted beneath the plate to give the proper attenuation characteristics or as shown in Figure 4, the attenuation may be contained in 91 as a resistance element itself, this being accomplished either by use of the proper type of resistant material or making the plate 91 out of a molded bar in which the resistant element is buried. The shaft 43 carrying the drum carries at one end a hand wheel 125 by means of which the drum may be turned manually. At the other end of the shaft 43 there is mounted a gear 126 meshing with a second gear 127 in a four to one ratio, which gear 127 drives the variable condenser 3 corresponding to the condenser 3 in Figure 2.

The motor driving the stylus and controlling the position of the attenuator switch is indicated in Figure 2 as 200, the stylus switch being indicated in Figure 2 as 201. Both of these are operated together. The recording motor as it is labeled in the figure may be driven either way by choice of the proper field 202 or 203. This is controlled by the relay 204 which is indicated more clearly in Figure 11. The relay 204 comprises a magnetic shell 205 forming a cylindrical magnet air gap 206 energized through direct current by the coil 207. The relay is of a moving coil type with the armature support 208 pivoted at one side of the shell as indicated at 209. The support 208 carries a cup shaped member 210 in the external groove 211 of which is placed the coil 212. At the end of the armature support or lever, there is mounted a switch contact 213 which makes contact with either the contact 214 on one side or 215 on the other side connecting either field in the circuit. When the contact goes one way the motor is driven in one direction, and when it moves the other way, the motor is driven in the other direction. In the non-contact position the motor does not move. As the motor moves one way or the other, it carries the attenuator contact or switch 201 and positions it along the attenuator thus varying the voltage on the grid 216. If this voltage is greater than the normal amount, current will flow through the circuit and through the relay coil 204 in a direction to close the relay switch one way or the other. If the voltage on the grid however drops below a certain point because of the contactor position, the relay will open and the motor cease to operate. If the switch 201 has gone beyond the normal balancing position, the voltage on the two tubes 217 and 218 will become unbalanced and current will flow in the opposite direction in the relay 204. The normal zero position of the contact switch 201 corresponds to the zero of the scale in the recording drum. This position may of course be adjusted for convenience and calibration.

Figure 3:
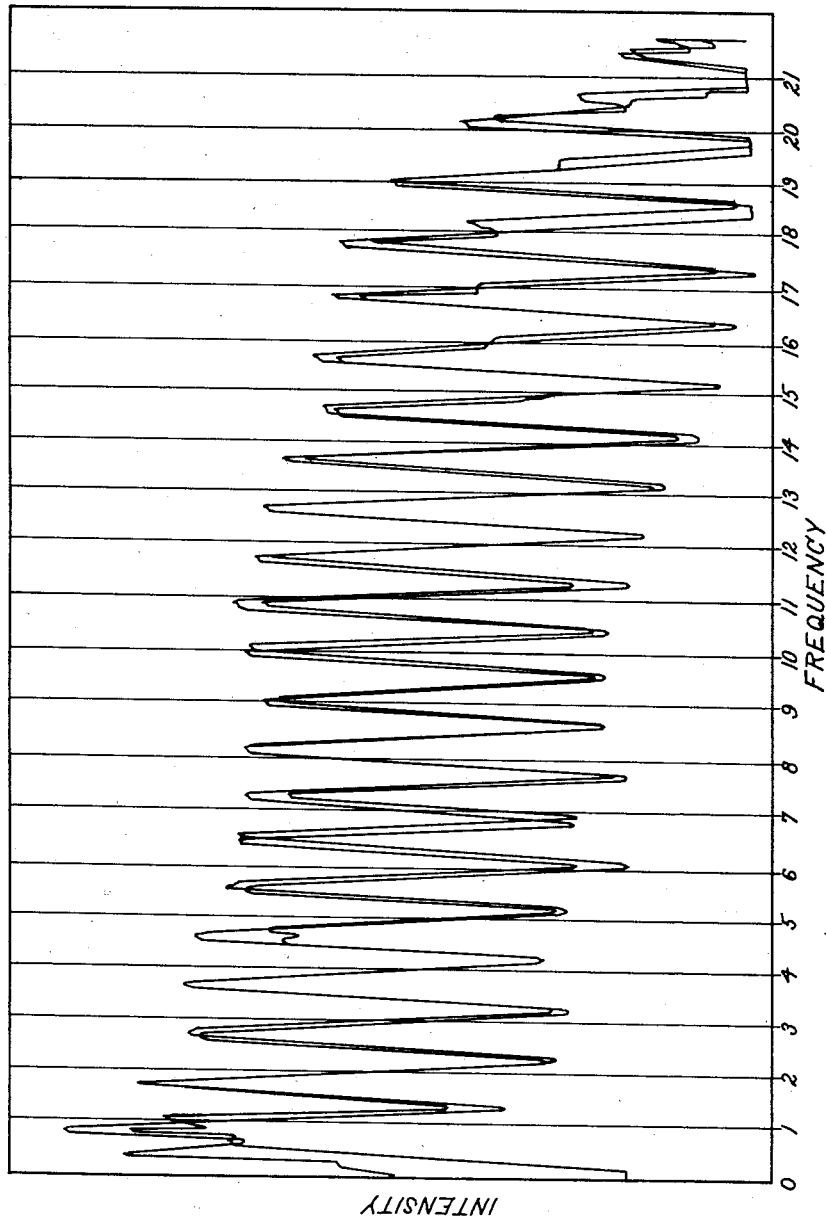
Figure 3 illustrates a characteristic curve taken on a power line.

In the operation of the system the line 219 is connected to the power line or other device under test. The drum carrying the condenser 3 as seen in Figure 4 is adjusted to a zero position at which the variable frequency oscillator corresponds in frequency to the fixed frequency oscillator. The recording paper may then be applied to the drum. If the stylus is not in the zero position on the scale, it may be placed there although this is not necessary as it will immediately come to its correct value when the system is started in operation. Figure 3 shows a graph obtained in actual test on a high power line. In this case ordinates represent intensity and the abscissae represent frequency. The curve is on a line in which a fault was present. As the frequency is varied from zero up to about 120,000 cycles in frequency, the intensity curve goes through a series of peaks and valleys whose points are very pronounced. This is particularly so because of the circuit in which the voltage varied markedly with the load or impedance, so that sharp maximums and minimums are obtained at the correct corresponding frequencies. These points of maximum and minimum indicate the phasing of the standing wave on the line and give as a result a direct measurement of the position of the fault. It will also be noted from a consideration of the curve that the peaks are spaced equally along the curve indicating a phasing for very certain frequency differences. Knowing the original line characteristics, the position of the fault can be definitely placed. The frequency spacing in the chart of Figure 3 may be computed as approximately 5710 cycles per second, since the length of the curve to the mark 17 corresponds to 120,000 cycles and in this spacing there are 21 peaks, the frequency being 120,000/21. In the particular measurement made this corresponded on the known line to 159 poles at which point the fault was located.

Having now described my invention, I claim:

1. A method of determining electrical characteristics of electrical apparatus which comprises impressing upon the electrical apparatus a predetermined current source of continually varying frequency, the current source being of such a character that a change in load of the electrical apparatus will correspondingly change the voltage impressed and recording the voltage variations as ordinates for the continually varying frequencies.

2. A method of determining faults in an electrical line or net-work which comprises impressing a power source adapted to have great variations in voltage with variations in load impedances of the line or net-work, and small variations of current, continually varying the frequency from a low value up to the order of 100,000 cycles per second and recording the variations of voltage corresponding to frequency changes, establishing a curve of maximum and minimum points and thereby the frequency differences between corresponding maximum points whereby the average frequency differences determine the position of the line or net-work fault.

3. Apparatus for analyzing line or net-work impedances which comprises in combination a variable frequency oscillator, an amplifier connected therewith having degeneration inversely proportional to the load impedance for impressing constant current at variable frequency upon the line or net-work and means connected at the sending end of the line for measuring and recording the voltage variation with variations in frequency.

W. ROBERT DRESSER.